(12) United States Patent
Bieber

(10) Patent No.: US 7,752,283 B2
(45) Date of Patent: Jul. 6, 2010

(54) SERVER FOR ENGINEERING AN AUTOMATION SYSTEM

(75) Inventor: Jürgen Bieber, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 1043 days.

(21) Appl. No.: 10/534,336

(22) PCT Filed: Sep. 26, 2003

(86) PCT No.: PCT/DE03/03218

§ 371 (c)(1),
(2), (4) Date: May 10, 2005

(87) PCT Pub. No.: WO2004/044739

PCT Pub. Date: May 27, 2004

(65) Prior Publication Data

US 2006/0080409 A1    Apr. 13, 2006

(30) Foreign Application Priority Data

Nov. 14, 2002    (DE) ................................ 102 53 174

(51) Int. Cl.
*G06F 15/16* (2006.01)
*G06F 17/28* (2006.01)
(52) U.S. Cl. .......................................... 709/219; 704/3
(58) Field of Classification Search .................. 709/220, 709/201, 219, 217, 218, 249; 707/501, 505, 707/506, 530, 513; 715/205; 704/2–4, 6, 704/7
See application file for complete search history.

(56) References Cited

U.S. PATENT DOCUMENTS

| 5,420,917 | A | * | 5/1995 | Guzman | ..................... 379/279 |
| 5,737,523 | A | * | 4/1998 | Callaghan et al. | ............. 726/21 |
| 5,911,776 | A | | 6/1999 | Guck | |
| 6,092,114 | A | | 7/2000 | Shaffer et al. | |

(Continued)

FOREIGN PATENT DOCUMENTS

DE    199 26 370 A1    12/2000

(Continued)

OTHER PUBLICATIONS

Michael G. Christel and C Hang Huang, "SVG for Navigating Digital News Video", Proceedings of the 9$^{th}$ ACM International Conference on Multimedia, Ottawa, Canada, Sep. 30-Oct. 5, 2001, ACM International Multimedia Conference, New York, NY: ACM, US; vol. Conf. 9; Sep. 30, 2001; pp. 483-485, XP002250552.

(Continued)

*Primary Examiner*—Nathan Flynn
*Assistant Examiner*—Mark O Afolabi

(57) ABSTRACT

A server (1) with a memory (7) that stores files for configuring an automation system. A remote client (4) accesses the files over communication links (2, 3, 5, 9, 10) via an interface (6, 8) in the server. The interface includes first means (8) for transmitting to one or more remote clients a copy of selected files in the memory. The interface further comprises second means (6) for receiving from remote clients files produced or modified by the remote clients. The first and second means of the interface convert the files between a format in the memory that can be processed by the server and a format for transmission that can be processed by the client.

12 Claims, 2 Drawing Sheets

U.S. PATENT DOCUMENTS

| | | | |
|---|---|---|---|
| 6,134,552 A | | 10/2000 | Fritz et al. |
| 6,151,609 A | * | 11/2000 | Truong ................. 715/205 |
| 6,205,120 B1 | * | 3/2001 | Packer et al. ............ 370/235 |
| 7,054,952 B1 | * | 5/2006 | Schwerdtfeger et al. .... 709/246 |
| 2002/0002452 A1 | * | 1/2002 | Christy et al. ............ 704/3 |
| 2002/0077933 A1 | | 6/2002 | Dutta et al. |
| 2003/0195886 A1 | * | 10/2003 | Vishlitzky et al. ......... 707/10 |

FOREIGN PATENT DOCUMENTS

| | | |
|---|---|---|
| DE | 100 53 665 A1 | 5/2002 |
| KR | 2001078439 A * | 1/2001 |
| WO | WO 01/73546 A2 | 10/2001 |

OTHER PUBLICATIONS

Jean Paoli, "Cooperative work on the network: edit the WWW!", Computer Networks and ISDN Systems, North Holland Publishing, Amsterdam, NL, vol. 27, No. 6, Apr. 1, 1995, pp. 841-847, XP004013186.

* cited by examiner

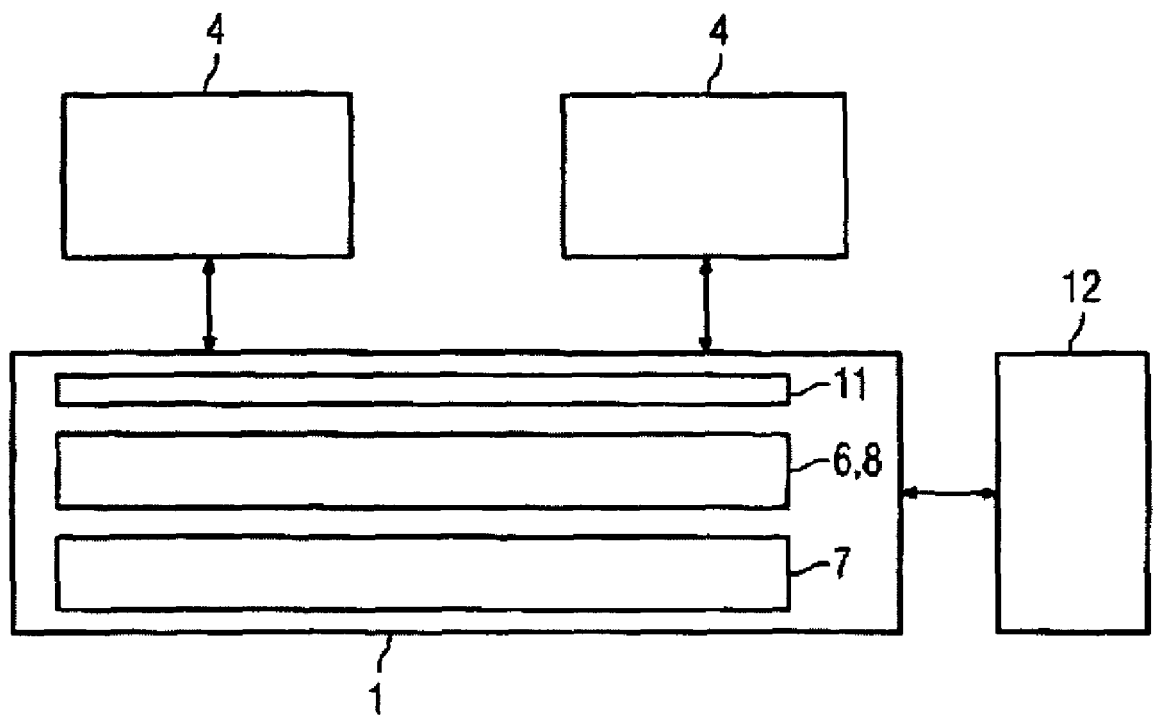

SERVER FOR ENGINEERING AN AUTOMATION SYSTEM

CROSS REFERENCE TO RELATED APPLICATIONS

This application is the US National Stage of International Application No. PCT/DE2003/003218, filed Sep. 26, 2003 and claims the benefit thereof. The International Application claims the benefits of German application No. 10253174.9 filed Nov. 14, 2002, both applications are incorporated by reference herein in their entirety.

FIELD OF THE INVENTION

The invention relates to a device for producing and/or configuring an automation system.

BACKGROUND OF THE INVENTION

For developing, producing, engineering, or project planning as well as for configuration or also modification of automation systems, it is desirable from the standpoint of costs for activities arising during the production, project planning, configuration or modification of the automation system to be undertaken by persons who are based at different locations. The usual current practice is thus to employ personnel based in different countries when producing automation systems. The actual automation system to be produced or configured can be located in any country.

To enable such international production or configuration of automation systems to be undertaken, tools have been employed in the prior art which allow persons tasked with the production or configuration of the automation system to access files which are required for producing or configuring the automation system and are stored on the automation system via a data link, such as a telephone line for example. In accordance with the prior art tools which are known to the person skilled in the art under names such as "PC Anywhere" or also "Netmeeting" are used.

Tools such as "PC Anywhere" or "Netmeeting" are also generally referred to as remoting tools. A person tasked with the production or configuration of the automation system and who gains access to the required files via this type of remoting tool is also referred to as a remote client.

With the remoting tools such as "PC Anywhere" and "Netmeeting" known from the prior art, the remote client dials in via a conventional telephone line to a device for production or configuration of the automation system. To enable a client to do this, the identical remoting tools must be installed on the device for production and configuration of the automation system—in the case described here a central server—and on the remote client. In accordance with the prior art there is thus a requirement for identical remoting tools to be present both on the remote client side and on the server side. Otherwise it is not possible for the remote client to access the server. In addition it is only ever possible in the prior art for one remote client to access the device for production or configuration of the automation system. Devices known from the prior art do not thus have multiuser capabilities.

SUMMARY OF THE INVENTION

Using this as its starting point, the present invention addresses the underlying problem of creating an innovative device for producing and/or configuring an automation system.

This problem is resolved by the claims.

In accordance with the invention, the interface of the device for producing and/or configuring automation systems features first means for transmitting to one or more remote clients a copy of each file stored on the storage system, with the interface further featuring second means for receiving the files created and/or modified by the remote client or by each remote client.

According to an advantageous development of the invention the first and second means are embodied as file format conversion means, where the file format conversion means convert the files from a file format that can be processed in the device into a file format that can be processed by the client or by each client and vice versa. Graphics data stored in the storage system is preferably converted into and from an SVG format which can be processed by the remote client or by each remote client, and text files stored in the storage system are preferably converted into and from a DHTML and JavaScript format which can be processed by the remote client or by each remote client.

Preferred developments of the invention are produced by the dependent claims and the subsequent description.

BRIEF DESCRIPTION OF THE DRAWINGS

A preferred exemplary embodiment of the invention is explained in greater detail below—without being restricted to this embodiment—with reference to the drawing. The drawing shows:

FIG. 3 a further block diagram to illustrate the functioning of the inventive device.

DETAILED DESCRIPTION OF THE INVENTION

Figure 1:
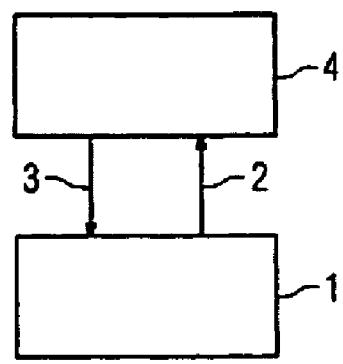
FIG. 1 a block diagram to illustrate the underlying principle of the invention.

FIG. 1 illustrates the underlying principle of the present invention as a highly schematic block diagram.

FIG. 1 thus shows an inventive device 1 for production or configuration of an automation system which communicates in the direction depicted by the arrows 2 and 3 with a remote client 4 and exchanges files or data. The device for production and/or configuration of the automation system can also be referred to as an engineering system. Stored on the device 1 for production or configuration of the automation system are files which are needed or created for production or configuration of the automation system. These files are stored on device 1 in a storage system not shown in the diagram. As a rule device 1 takes the form of a server.

Remote client 4 is now to access device 1 for the purposes of production or configuration of the automation system and in doing so, is to modify files stored on device 1 or create new files by using files stored on device 1. This requires the device 1 to transfer data to the remote client 4 in the direction of arrow 2 and the remote client 4 to transmit the modified or created data in the opposite direction in the direction of the arrow 3 to the device 1.

It is now possible within the scope of the present invention to enable communication between the device 1 and the remote client 4 by using browser-based Web technologies. This means that only an operating system and a browser for Internet applications or Intranet applications is present or installed on the remote client side The device 1 in accordance with the invention for production or configuration of an automation system is assigned an interface not shown in FIG. 1 which allows communication between the device 1 and the browser-based remote client 4 via the Internet or Intranet. To make this possible, the interface includes first means to transmit to the remote client 4 a copy of the files which are stored on the storage system of the device 1 and which the remote client 4 needs for production and/or configuration of the automation system. It follows from this that, in the sense of the invention, the remote client 4 does not directly modify or access the files stored on the device 1, but instead is presented with a copy of these files. Furthermore the interface includes second means for receiving files created and/or modified on the remote client 4 and finally for storing them back on the storage system.

Even from the greatly simplified presentation given above of the device in accordance with the invention a central advantage of the invention is evident. This lies in the fact that identical remoting tools no longer have to be installed on the device 1 and on the remote client 4. Access from the remote client 4 to the device 1 is browser-based and is undertaken via the Internet or the Intranet.

The first and second means of the interface which allow communication between the device 1 and the remote client 4 are file format conversion means. Thus it must be ensured that the files stored on the device 1 are made available to the remote client 4 in a format in which it is possible to modify the files or to create new files. These files can be graphics files on the one hand and text files on the other hand.

Graphics files stored on the device 1 are converted by the interface for the remote client 4 which needs to access the corresponding graphics file into what is known as an SVG format. The SVG (Scaleable Vector Graphics) format involves a markup language based on XML technology for description of scalable and transformable vector graphics. The person skilled in the art to whom this document is addressed will be familiar with details of the SVG format, so that no detailed descriptions of the principle of the SVG data format need be provided here.

Text files are also transmitted via XML technology or via HTML elements. To enable the files to be processed on the remote client 4, a menu, a toolbar or property pages will be needed, depending on the selected project planning object. To implement this in a Web-based environment, these elements are implemented as menus, toolbars or property pages in the DHTML format with JavaScript elements. These formats are also familiar to those skilled in the art—the intended readership of this document.

By converting the files stored on the inventive device in an SVG format or DHTML JavaScript format it becomes possible for the first time to make available to a remote client 4, which merely has to feature an operating system and a browser, files for production and configuration of an automation system in such a way that these files can be processed on the remote client 4 regardless of the format needed in the device 1.

Figure 2:
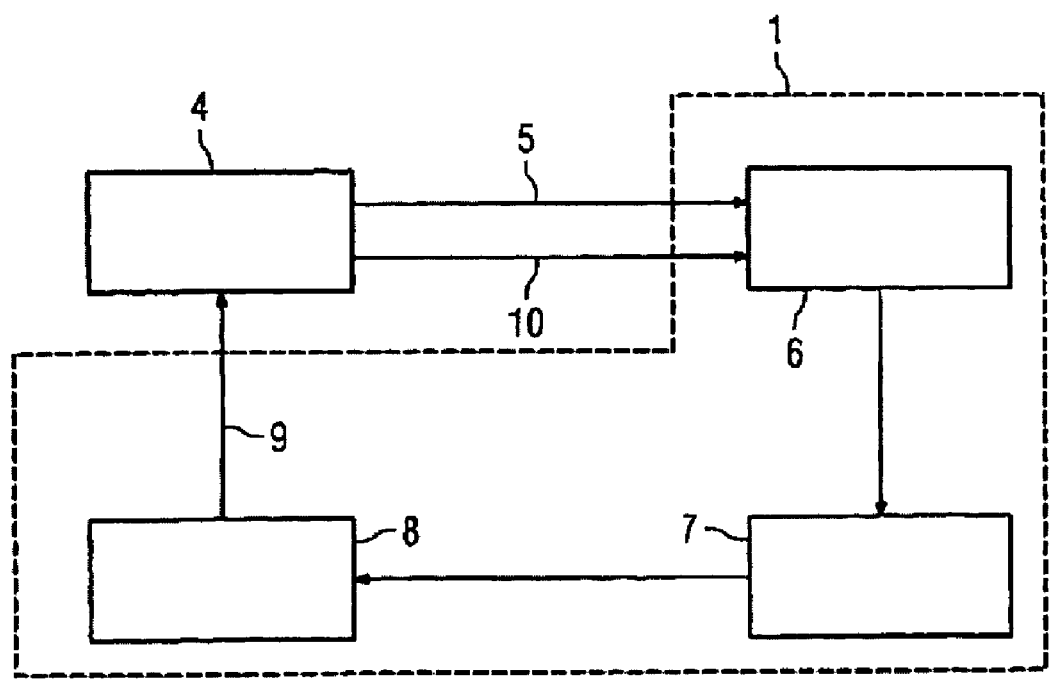
FIG. 2 a block diagram to illustrate the functioning of the inventive device.

FIG. 2 illustrates the functioning of the device in accordance with the inventive device on the basis of a block diagram. Thus FIG. 2 again shows the remote client 4, which is connected to the device 1 for the production or configuration of an automation system in accordance with the invention. If a file required for the production or configuration of the automation system is now to be modified or created via the remote client 4, the remote client 4 on which only an operating system and also an Internet browser or Intranet browser is installed, dials into the device 1 in the direction of the arrow 5. As already explained in connection with FIG. 1, the remote client 4 and the device 1 communicate via an interface, with the interface featuring first means to transmit to the remote client 4 copies of the required files and furthermore features second means for receiving files created and/or modified on the remote client 4.

The second means of the interface, identified in FIG. 2 by reference number 6, is thus used to transfer data from the remote client 4 to the device 1. This data can of course also be the dial-in process in the sense of arrow 5. The remote client 4 uses the interface to access the files stored on the storage system 7 of the inventive device 1. This can involve one or more of the files stored in the storage system 7, for example graphics files and/or text files. These graphics files and text files are stored in the storage system 7 of the inventive device 1 in a special file format.

Copies of the files needed by the remote client 4 are subjected via the first means, which is identified in FIG. 2 with the reference number 8 of the interface, to a file format conversion. Thus required graphics files are converted by the interface, namely by the first means 8 of the interface, into an SVG format and text files with which menus or property pages are to be transmitted to the remote client 4 are converted into a DHTML format with JavaScript. The files subjected to a format conversion in this way are then routed by the interface in the direction indicated by arrow 9 to the remote client 4.

In the remote client 4 the copies of the files stored on the storage device 7 which were converted by the interface into a format which could be processed by the remote client 4 are modified, but new files can also be created. The files thus modified or created are then transmitted from the remote client 4 in the direction of the arrow 10 back to the device 1. The files are then converted by the second means 6 of the interface into the file format in which the files are to be stored in the storage system 7.

Further aspects of the inventive device are explained with reference to the block diagram of FIG. 3. FIG. 3 thus shows two remote clients 4 which, for producing and or configuring the automation system, exchange data or files with the inventive device 1. So that the inventive device 1 has both multiuser capabilities, i.e. it can be accessed by a number of remote clients 4 simultaneously, but also ensures that only one remote client can even access one or more specific files stored in the storage system, the inventive device 1 has an access management device 11.

In the access management device 11 the files stored in the storage system 7, for example graphics files or text files, are administered such that a log is kept on the one hand of which remote client 4 is accessing which of the files, and on the other hand conflict resolution is provided for the case in which a number of remote clients 4 simultaneously wish to a access a specific file. If a first remote client 4 dials into the inventive device 1 and accesses a number of files stored on the storage system 7, as explained above, a local copy of the corresponding files is made for this first remote client and in addition these files are locked for this remote client. In other words this means that these files are made available exclusively for the remote client which first accesses the files and is processing them. If a second remote client 4 now dials into the inventive device 1 and wishes to access the same files to which the first remote client 4 has already obtained access, this fact is indicated to the second remote client 4 via the access management device 11. The following variants are conceivable here:

In accordance with the first variant the files to which two or more remote clients 4 simultaneously wish to have access are reserved for the remote client which first accessed the corresponding files. The access management device 11 then only makes these files available to the second remote client 4 when the first remote client 4 has released these files again by ending processing of the files. The access management device 11 will in this case notify the second remote client 4 accordingly.

In accordance with a second variant the access management device 11 can, if the second remote client 4 wishes to access the files which are reserved for the first remote client, notify the first remote client 4 that the second remote client 4 wishes to access the files. Depending on the reaction of the first remote client 4, the access management device 11 in this variant can continue to reserve the corresponding files for the first remote client 4 or can withdraw them from the first remote client 4 and make them available to the second remote client.

In accordance with a further variant it is possible to assign the different remote clients different priorities and for the access management device 11 to design access to the files stored in the storage system 7 so that it depends on the priority of the remote clients 4. If the first remote client 4 has a higher priority than the second remote client which wishes to obtain access to specific files after the first remote client, the access rights remain with the first remote client. On the other hand if the second remote client 4 has a higher priority, the access management device 11 would notify the first remote client 4 that a remote client 4 with a higher priority is being given access to files processed by the first remote client 4 and will withdraw these files from the first remote client and make them available to the second remote client 4.

This type of access management device 11 gives the inventive device multiuser capabilities. A number of remote clients 4 can simultaneously access different files. The system also ensures that only one remote client 4 ever obtains access to a specific file.

Furthermore FIG. 3 shows a security device 12 assigned to the inventive device 1. In the security device 12 passwords of remote clients wishing to access the inventive device 1 are interrogated and also managed or administered. This makes it possible to ensure that access to the inventive device for producing and/or configuring the automation system is only possible from authorized remote clients 4. It is also possible for just a specific selection of files stored on the storage system 7 to be released to a remote client 4, on basis of a password, by the security device 12. This makes it possible to allow specific remote clients 4 to have access to just specific files.

In the sense of the invention a device for producing and/or configuring an automation system is therefore proposed which has both remote capabilities and multiuser capabilities and is based on the use of browser-based Web technologies. The invention provides a unique and innovative approach to finding a solution to the problem of providing access to remote clients to files stored on the inventive device without the entire application having to be installed at the remote client. The remote client merely needs an operating system as well as an Internet browser or Intranet browser. It is within the scope of the invention to convert graphics files stored on the device into an SVG format. It is known to the present invention of that the SVG format is especially suitable. By using the SVG format for the graphics files the file sizes can be kept small. Thus with the SVG format only vector coordinates are stored and not, as is otherwise normal, individual pixels or graphics. Furthermore the use of SVG technology allows the graphics files to be logged at the remote client.

The invention claimed is:

1. A server for engineering an automation system, comprising:
   a remote client comprising a Web browser;
   a storage system in the server, in which files are stored in a first format that cannot be processed by the Web browser, the files being needed or created for engineering the automation system;
   a communications interface in the server via which the remote client accesses the files, wherein the interface comprises first means for converting and transmitting the remote client a copy of selected ones of the files in a second format comprising HTML or DHTML or XML or JavaScript or SVG, that can be processed by the Web browser of the remote client, and the interface comprises second means for receiving files created or modified from each remote client, converting the received files into the first format, and storing the received files into the storage system in the first format;
   wherein the selected ones of the files in the second format are modified by the remote client;
   wherein the access management device prioritizes access to the given file by assigning different access priorities to different clients, locks the given file for access by an earliest requesting client until a later requesting client requests the given file, then compares the access priorities of the earliest and later requesting clients, and if the later requesting client has higher access priority than the earliest requesting client, notifies the earliest requesting client that access to the given file will be switched to the later requesting client, otherwise continuing to reserve the given file for the earliest requesting client; and
   wherein the first format is not HTML and not DHTML and not XML and not SVG and not JavaScript.

2. The server of claim 1, wherein a plurality of clients including the remote client access the files, and further comprising a security device in the server that authorizes a specific selection of the files to each of the clients by password interrogation.

3. The server of claim 2, further comprising an access management device in the server that resolves conflicts when first and second clients attempt to simultaneously access a given file by locking the given file for access by only the first client, and indicating a locked status to the second client.

4. The server of claim 3, wherein the access management device prioritizes access to the given file by locking the given file for access by an earliest requesting client until the earliest requesting client releases the file.

5. The server of claim 3, wherein the access management device coordinates access to the given file by locking the given file for access by an earliest requesting client until a later requesting client requests the file, then notifies the earliest requesting client of the later requesting client, and allows the earliest requesting client to choose to retain access or release it.

6. A server for engineering and configuring an automation system, comprising:
   a memory in the server for storing files for engineering and configuring the automation system, wherein the files are stored in a first format that can be processed by the server;
   an interface in the server for providing network access to the files by a client comprising a Web browser, the client being remote from the server, wherein the Web browser cannot process files in the first format, wherein the interface comprises:
   a first means for making a copy of selected files in the memory, converting the copy to a second format that can be processed by the Web browser in the client, and transmitting the copy in the second format to the client;
   a second means for receiving files created or modified by the remote client, converting the received files from a received format into the first format, and storing them in the memory; wherein the selected files in the second format are modified by the remote client;
   wherein the access management device prioritizes access to the given file by assigning different access priorities to different clients, locks the given file for access by an earliest requesting client until a later requesting client requests the given file, then compares the access priorities of the earliest and later requesting clients, and if the later requesting client has higher access priority than the earliest requesting client, notifies the earliest requesting client that access to the given file will be switched to the later requesting client, otherwise continuing to reserve the given file for the earliest requesting client; and wherein the first format is not HTML and not DHTML and not XML and not SVG and not JavaScript.

7. The server in accordance with claim 6, wherein:

the remote client is embodied as a browser-based client that communicates with the interface via an Internet or Intranet data line;

the first and second means provide conversion means for graphics files and conversion means for text files;

the conversion means for graphics files converts graphics files stored in the memory into an SVG format that can be processed by the remote client and vice versa; and the conversion means for text files converts the text files stored in the memory into a DHTML format that can be processed by the remote client.

8. The server in accordance with claim 7, further comprising an access management device, which, if more than one remote client accesses a file stored in the memory, only allows access to the file by one of these remote clients.

9. The server of claim 6, wherein a plurality of clients including the remote client access the files, and further comprising a security device in the server that authorizes each client access to a specific selection of files in the memory by password interrogation of each client, and an access management device in the server that keeps a log of which of the clients is accessing which of the files, and provides conflict resolution when more than one client simultaneously requests access to a specific file.

10. The server of claim 9, wherein the access management device that resolves conflicts when first and second clients attempt to simultaneously access a given file by locking the given file for access by only the first client, and indicating a locked status to the second client.

11. The server of claim 10, wherein the access management device prioritizes access to the given file by locking the given file for access by an earliest requesting client until the earliest requesting client releases the file.

12. The server of claim 10, wherein the access management device coordinates access to the given file by locking the given file for access by an earliest requesting client until a later requesting client requests the file, then notifies the earliest requesting client of the later requesting client, and allows the earliest requesting client to choose to retain access or release it.

* * * * *